US008352079B2

(12) United States Patent
Wendt

(10) Patent No.: US 8,352,079 B2
(45) Date of Patent: Jan. 8, 2013

(54) LIGHT MANAGEMENT SYSTEM WITH AUTOMATIC IDENTIFICATION OF LIGHT EFFECTS AVAILABLE FOR A HOME ENTERTAINMENT SYSTEM

(75) Inventor: Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 12/740,388

(22) PCT Filed: Nov. 4, 2008

(86) PCT No.: PCT/IB2008/054574
§ 371 (c)(1),
(2), (4) Date: Apr. 29, 2010

(87) PCT Pub. No.: WO2009/060376
PCT Pub. Date: May 14, 2009

(65) Prior Publication Data
US 2010/0244745 A1    Sep. 30, 2010

(30) Foreign Application Priority Data
Nov. 6, 2007 (EP) .................................. 07120049

(51) Int. Cl.
*G06F 19/00* (2011.01)
*H05B 37/02* (2006.01)
(52) U.S. Cl. ........................................ 700/275; 315/312
(58) Field of Classification Search .................... 700/11, 700/13, 19, 275; 315/312; 381/300; 382/103
See application file for complete search history.

(56) References Cited

U.S. PATENT DOCUMENTS 6,192,282 B1 * 2/2001 Smith et al. ...................... 700/19
6,564,108 B1 * 5/2003 Makar et al. ..................... 700/19
(Continued)

FOREIGN PATENT DOCUMENTS
WO       0105195 A1    1/2001
(Continued)

*Primary Examiner* — Charles Kasenge
(74) *Attorney, Agent, or Firm* — Mark L. Beloborodov

(57) ABSTRACT

The invention relates to the automatic identification of light effects available for a home entertainment system with a light management system. According to an embodiment of the invention, a light management system (10) with automatic identification of light effects available for a home entertainment system (12), wherein the light management system (10) is adapted for—automatically composing a lighting scene from an abstract light experience description (14), which describes types of light effects at certain locations relative to the entertainment system, —automatically registering light effects controlled by the light management system (10) and being available for the home entertainment system (12), and—automatically integrating the registered light effects in the composition of the lighting scene. This allows to automatically identify light effects generated by light sources in a room and controllable by a light management system and make them available for a home entertainment system such as an amBX® system.

4 Claims, 1 Drawing Sheet

U.S. PATENT DOCUMENTS

| | | | |
|---|---|---|---|
| 6,761,470 B2 * | 7/2004 | Sid | 315/312 |
| 6,771,323 B1 * | 8/2004 | Dean et al. | 348/722 |
| 7,047,092 B2 * | 5/2006 | Wimsatt | 700/83 |
| 7,053,915 B1 * | 5/2006 | Jung et al. | 345/633 |
| 7,180,252 B2 * | 2/2007 | Lys et al. | 315/312 |
| 7,202,613 B2 | 4/2007 | Morgan et al. | |
| 7,599,502 B2 * | 10/2009 | Stromme | 381/92 |
| 7,630,501 B2 * | 12/2009 | Blank et al. | 381/58 |
| 7,649,456 B2 * | 1/2010 | Wakefield et al. | 340/539.13 |
| 7,843,333 B2 * | 11/2010 | Angelhag et al. | 340/539.13 |
| 7,864,043 B2 * | 1/2011 | Camp, Jr. et al. | 340/539.13 |
| 2004/0125044 A1 * | 7/2004 | Suzuki | 345/1.1 |
| 2005/0248299 A1 | 11/2005 | Chemel et al. | |

FOREIGN PATENT DOCUMENTS

| | | |
|---|---|---|
| WO | 02092184 A1 | 11/2002 |
| WO | 02099780 A2 | 12/2002 |
| WO | 2005052751 A2 | 6/2005 |
| WO | 2005058442 A1 | 6/2005 |
| WO | 2005069640 A1 | 7/2005 |
| WO | 2006111927 A1 | 10/2006 |

* cited by examiner

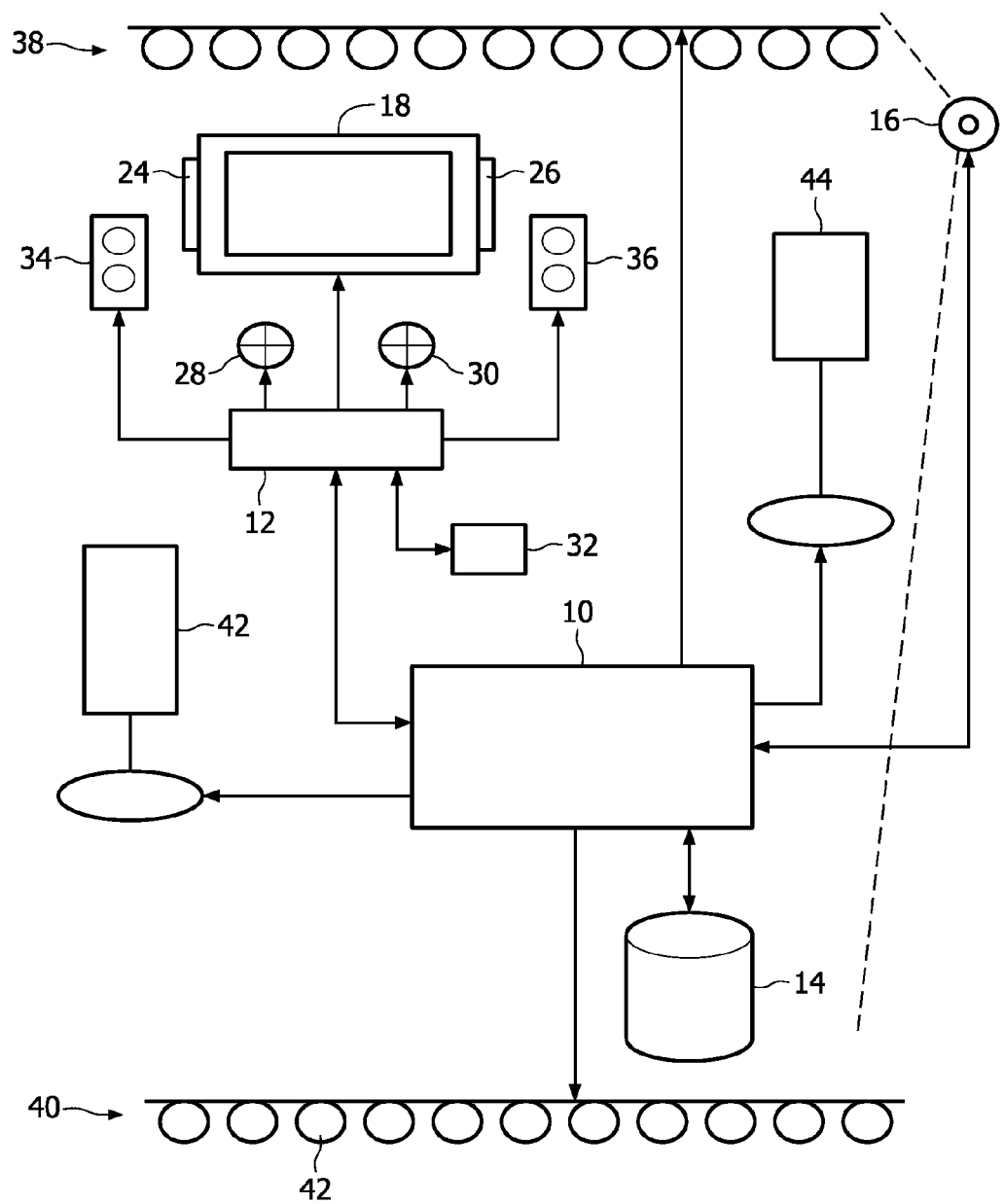

LIGHT MANAGEMENT SYSTEM WITH AUTOMATIC IDENTIFICATION OF LIGHT EFFECTS AVAILABLE FOR A HOME ENTERTAINMENT SYSTEM

The invention relates to the automatic identification of light effects that may be available for a home entertainment system with ambient light experience functionality like amBX®.

Modern home entertainment systems such as sophisticated consoles or computer games may be able to generate certain light effects in order to create a realistic ambient atmosphere. An example of such a home entertainment system is the amBX® system, which includes a number of hardware devices that experience developers can use to enhance the gaming or movie watching experience, including fans for air movement, multi-colored lights and a vibration rumbler. The lamps normally get purchased in an amBX® set and have to be installed at the proper locations relative to a monitor or TV set. amBX® is shorthand for "amBient eXperience" and describes a concept for combining multiple user experiences such as surround lighting, sound, vibration, air movement and other effects.

If lamps already present in a room shall be made used for an ambient experience with a home entertainment system, they have to be manually made known to a light management system. Locations of lamps have to be mapped into the location space of the home entertainment system in order to get the right settings. In addition the optical parameters of the lamps have to be entered.

It is an object of the invention to make it easier to control the light effects of a home entertainment system by means of a light management system.

The object is achieved by the independent claim(s). Further embodiments are shown by the dependent claim(s).

A basic idea of the invention is to automatically identify light effects generated by the light sources in a room controllable by a light management system, which enables automated translation of one light experience effects scene into a light scene rendered in accordance with the available light modules. Known in the art are entertainment systems for gaming or movie viewing with enhanced experiences generated by ambient light sources e.g. amBX® enabled systems. In such an entertainment system, an effect scripting language may be used in order to describe effects synchronous to the game or the shown movie. One of the roles of scripting is to allow the description of ambient experience effects without any explicit knowledge about the particularly installed experience lighting hardware or the specific layout of a room among others. Thus, the light effects of the home entertainment system may be automatically identified with the light management system and used in the process of an automated translation to control commands towards the lighting devices. So the tedious process of manually entering light effects as available for the home entertainment system, their locations and further parameters into the light management system can be significantly simplified. This allows a comfortable integration of the light effects for a home entertainment system, particularly of an amBX® system, with a lighting system controlled with a light management system.

In the following, some important terms used herein are explained.

The term "lighting atmosphere" as used herein means a combination of different lighting parameters such as intensities of different spectral components of lighting, the colors or spectral components contained in a lighting, the color gradient or the like.

The term "abstract atmosphere description" of a lighting atmosphere means a description of the atmosphere at a higher level of abstraction than a description of settings of the intensity, color or like of every individual lighting device or unit of a lighting system. It means for example the description of the type of a lighting such as "diffuse ambient lighting", "focused accent lighting", or "wall washing" and the description of certain lighting parameters such as the intensity, color, or color gradient at certain semantic locations at certain semantic times, for example "blue with low intensity in the morning at the cash register" or "dark red with medium intensity at dinner time in the whole shopping area".

The term "semantic location" means a description of a location such a "in front of a screen" in a room of a home entertainment system user in contrast to a concrete description of a location with coordinates.

It should be understood that the abstract description of a lighting atmosphere does not comprise concrete information about a specific instance of a lighting system such as the number and locations of the used lighting units or devices and their colors and available intensities.

The term "lighting system" comprises a complex system for illumination, particularly containing several lighting units, for example a plurality of LEDs (light emitting diodes) or other lighting devices such as halogen bulbs. Typically, such a lighting system applies several tens to hundreds of these lighting devices so that the composition of a certain lighting atmosphere by individually controlling the characteristics of each single lighting device would require computerized lighting control equipment.

According to an embodiment of the invention, a light management system with automatic identification of light effects available for a home entertainment system is provided, wherein the light management system is adapted for automatically composing a lighting scene from an abstract light experience description, which describes types of light effects at certain locations relative to the entertainment system, automatically registering light effects controlled by the light management system and being available for the home entertainment system, and automatically integrating the registered light effects in the composition of the lighting scene.

This allows to automatically identify light effects generated by light sources in a room and controllable by a light management system and make them available for a home entertainment system such as an amBX® system.

According to a yet further embodiment of the invention, the light management system may comprise a camera and may be further adapted for automatically registering the positions of installed light effects relative to a screen of the home entertainment system by analyzing pictures taken with the camera. The camera may be a digital camera supplying a picture analyzing unit of the light management system with digital pictures of for example a room containing a lighting system and the home entertainment system. This picture analyzing unit may be for example embodied as software and able to detect light effects in the pictures.

The light management system may be further adapted in an embodiment of the invention for automatically registering the picture of a calibration scene displayed on the screen of the home entertainment system by analyzing pictures taken with the camera, automatically determining the position of the registered picture of the calibration scene in a room and relative to all registered light effects, and automatically identifying lamps being able to make light effects at predefined locations to the home entertainment system.

The calibration scene may serve as a kind of reference point for the light management system. The light management system can then determine which lamps at which positions in a room relative to the position of the picture with calibration scene should be used for light effects together with light effects generated by the home entertainment system.

Furthermore, the light management system may be adapted in a further embodiment of the invention for registering and mapping available ambient lighting features of the screen of the home entertainment system to semantic locations.

The light management system may be according to a further embodiment of the invention adapted for
   automatically registering other experience actuators, particularly blowers and flashes, and
   automatically parameterizing the registered other experience actuators for the available directions.

In a further embodiment of the invention, the light management system may be further adapted for
   automatically registering positions of loud speakers of the home entertainment system, and
   automatically controlling the sound processing of the home entertainment system such depending on the automatically registered positions of the loud speakers.

This allows also controlling sound effects, which may be generated by the home entertainment system, with the light management system.

The light management system may be according to a further embodiment of the invention adapted for controlling the sound processing of the home entertainment system in a way that the phase is optimally adjusted for the registered positions of the loud speakers.

A further embodiment of the invention relates to a method in a light management system according to the invention for automatically identifying light effects available for a home entertainment system, comprising
   automatically composing a lighting scene from an abstract light experience description, which describes types of light effects at certain locations relative to the entertainment system,
   automatically registering light effects controlled by the light management system and being available for the home entertainment system, and
   automatically integrating the registered light effects in the composition of the lighting scene According to a further embodiment of the invention, a computer program is provided, wherein the computer program may be enabled to carry out the method according to the invention when executed by a computer.

According to an embodiment of the invention, a record carrier such as a CD-ROM, DVD, memory card, floppy disk or similar storage medium may be provided for storing a computer program according to the invention.

In a further embodiment of the invention, a computer may be programmed to perform a method according to the invention and may comprise communication means for communicating with a lighting system.

These and other aspects of the invention will be apparent from and elucidated with reference to the embodiment(s) described hereinafter.

The invention will be described in more detail hereinafter with reference to the exemplary embodiment. However, the invention is not limited to this exemplary embodiment.

FIG. 1 shows an embodiment of a light management system according to the invention, wherein the light management is coupled with a home entertainment system such as amBX®.

FIG. 1 shows a light management system 10 which controls light systems 38 and 40 as well as standard lamps 42 and 44. The light systems 38 and 40 each comprise a plurality of light units 42, such as LEDs or halogen bulbs. The light management system 10 may be coupled with a home entertainment system 12 such as a game console, a Personal Computer, an amBX® system or any other kind of electronic device adapted to generate light effects.

Furthermore, the light management system 10 is adapted to perform an automated translation of a specification of a light scene or more generally of a lighting atmosphere, written for example in an ADL, and stored in a database 14 comprising light scene specifications or descriptions of lighting atmospheres. Thus, the light management system 10 is able to automatically compose a certain lighting atmosphere from an abstract atmosphere description stored as for example a XML file in the database 14.

The light scene specification or abstract lighting atmosphere description particularly describe types of light effects at certain semantic locations in a room or building or generally in a lighting infrastructure. In order to perform the automatic composition, the light management system 10 may comprise a so-called rendering pipeline which receives as input an abstract description, for example a XML file, and outputs control signals or values for light units of a concrete implementation of a lighting system.

The light management system 10 is further connected to a camera 16, which is provided to supervise for example a room and to supply pictures of the supervised room to the light management system 10 for further processing. In order to perform the picture processing, the light management system 10 comprises an automatic picture analysis module, which is adapted to analyze the pictures for light effects in the room.

The home entertainment system 12 is connected to a TV screen 18, which displays pictures generated by the home entertainment system 12 and output to the TV screen 18 via a video interface. The home entertainment system 12 is also adapted to output audio signals and, thus, comprises audio interfaces for connecting to loudspeakers 34 and 36.

In order to contain a highly realistic atmosphere for example for computer games or videos, the home entertainment system 12 may also control further experience actuators such as blowers 28 and 30 and flashes 32. Furthermore, the TV screen 18 may comprise ambient lights 24 and 26 for creating an ambient lighting for example adapted to the atmosphere of a certain movie or game displayed on the TV screen 18. The light management system 10 may register light effects of the home entertainment system 12 in several ways. For example, the available light effects of the home entertainment system 12 may be transferred to the light management system via a certain interface. Thus, the light management system 10 receives directly from the home entertainment system 12 the available light effects and may register these light effects for using them when composing a certain lighting atmosphere from an abstract description. The light management system 10 may also register light effects from the home entertainment system 12 via the camera 16. For example, the light management system 10 may detect a certain calibration picture shown on the TV screen 18 and generated by the home entertainment system 10. When the picture analysis module of the light management system 10 detects such a calibration picture, it may analyze from the calibration picture the available light effects of the home entertainment system 12 and register them for using them when composing a certain lighting atmosphere from an abstract description.

After registration the light effects of the home entertainment system 12 may directly go into dynamic changes in the ADL input of the rendering pipeline of the light management system when automatically composing a lighting atmosphere. Beneficially the semantic areas are the locations of light effects of the home entertainment system 12. The light management system 10 will make sure that the right lamps or light units 42 get controlled and color space of various lamps be used.

A so-called dark room calibration (DRC) of the light management system 10 can be used in addition to determine the position of the TV screen (or a computer monitor) 18 in order to give the home entertainment system's light effects locations the right positions relative to the TV screen 18. The light management system 10 typically uses dark room calibration (DRC) to learn all lamps available and the light parameters. This process switches each controllable light channel separately on and uses a camera 16 to detect a change in the light. If lamps are found on a remote channel further steps may be used to learn influence of cannel parameters on the light effect. DRC allows to also registering the picture of a calibration scene displayed by the home entertainment system 12 on the TV screen 18. The position of this picture in the room and relative to all registered light effects allows automatic identification of lamps able to make light effects at the predefined light effect locations (front left/right, back left/right etc.).

In a further embodiment of the invention, also the TV screen 18 can be identified and if available ambient lighting features 24 and 26 of the TV screen 18 may be mapped to locations of further light effects and registered for the automatic composition of lighting atmospheres.

In a further improved embodiment other experience actuators like blowers 28 and 30, flashes 32, etc. can be identified in calibration pictures as recorded by the camera 16 and automatically parameterized for the available directions.

The invention is particularly applicable in consumer light management systems, which should supporting light effects from home entertainment systems such as amBX® light effects.

At least some of the functionality of the invention may be performed by hard- or software. In case of an implementation in software, a single or multiple standard microprocessors or microcontrollers configuration may be used. The invention might be implemented by single or multiple algorithms.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for automatically identifying, by a light management system including one or more light sources, a plurality of light effects available for a home entertainment system disposed in a room and including a screen and a plurality of loudspeakers, the method comprising the steps of:
   automatically composing a lighting scene from an abstract light experience description, which describes types of light effects at predefined locations in the room relative to the home entertainment system,
   automatically registering light effects of lamps controlled by the light management system and being available for the home entertainment system,
   automatically registering positions of light effects relative to the screen of the home entertainment system by analyzing a picture taken with a camera, and
   automatically integrating the registered light effects in the composition of the lighting scene.

2. The method of claim 1, further comprising the steps of automatically registering the picture of a calibration scene displayed on the screen of the home entertainment system by analyzing pictures taken with the camera,
   automatically determining the position of the registered picture of the calibration scene in the room and relative to all registered light effects, and
   automatically identifying lamps being able to make light effects at predefined locations to the home entertainment system.

3. The method of claim 1, further comprising the step of registering and mapping available ambient lighting features of the screen of the home entertainment system to semantic locations.

4. The method of claim 1, further comprising the steps of:
   automatically registering positions of loud speakers of the home entertainment system, and
   automatically controlling the sound processing of the home entertainment system depending on the automatically registered positions of the loud speakers.

* * * * *